US010881123B2

(12) United States Patent
Fevzioglu et al.

(10) Patent No.: US 10,881,123 B2
(45) Date of Patent: Jan. 5, 2021

(54) CRYSTAL MORPHOLOGY FOR SODIUM REDUCTION

(71) Applicant: Frito-Lay North America, Inc., Plano, TX (US)

(72) Inventors: Mehtap Fevzioglu, Frisco, TX (US); Sivaraj Kaliappan, Schaumburg, IL (US); James William Stalder, Dallas, TX (US)

(73) Assignee: Frito-Lay North America, Inc., Plano, TX (US)

( * ) Notice: Subject to any disclaimer, the term of this patent is extended or adjusted under 35 U.S.C. 154(b) by 319 days.

(21) Appl. No.: 15/795,910

(22) Filed: Oct. 27, 2017

(65) Prior Publication Data

US 2019/0124967 A1     May 2, 2019

(51) Int. Cl.
| | | |
|---|---|---|
| A23L 27/40 | (2016.01) | |
| C01D 3/04 | (2006.01) | |
| C01D 3/08 | (2006.01) | |
| A23L 29/00 | (2016.01) | |

(52) U.S. Cl.
CPC ............... *A23L 27/40* (2016.08); *A23L 29/00* (2016.08); *C01D 3/04* (2013.01); *C01D 3/08* (2013.01); *A23V 2002/00* (2013.01); *C01P 2002/80* (2013.01); *C01P 2004/03* (2013.01); *C01P 2004/61* (2013.01); *C01P 2006/12* (2013.01)

(58) Field of Classification Search
None
See application file for complete search history.

(56) References Cited

U.S. PATENT DOCUMENTS

| | | | |
|---|---|---|---|
| 6,866,688 B2 | 3/2005 | Mayer | |
| 7,041,144 B2 | 5/2006 | Kozyuk | |
| 9,808,030 B2 | 11/2017 | Johal et al. | |
| 2006/0150892 A1 | 7/2006 | Mayer | |
| 2006/0182808 A1 | 8/2006 | Bakker et al. | |
| 2008/0008790 A1* | 1/2008 | Jensen | A23L 7/191 426/97 |
| 2011/0229607 A1 | 9/2011 | Wang et al. | |
| 2013/0131029 A1 | 5/2013 | Bakker | |

(Continued)

FOREIGN PATENT DOCUMENTS

| | | |
|---|---|---|
| CN | 101565190 A | 10/2009 |
| EP | 0857690 A1 | 8/1998 |

(Continued)

OTHER PUBLICATIONS

Pettit, et al., Characterization of sodium chloride crystals grown in microgravity, Journal of Crystal Growth 324 (2011) 207-211 (Pettit).*

(Continued)

*Primary Examiner* — Amber R Orlando
*Assistant Examiner* — Philip A Dubois
(74) *Attorney, Agent, or Firm* — Barnes & Thornburg LLP; G. Peter Nichols

(57) ABSTRACT

A novel salt composition and a corresponding method of manufacture are described herein. The salt composition is formed from a plurality of salt crystals with a surface area of at least 0.19-0.23 $m^2/g$ and a Hall density of less than 0.8 $g/cm^3$. In some embodiments, at least a portion of the salt composition has a hopper cube morphology.

14 Claims, 9 Drawing Sheets

(56) References Cited

U.S. PATENT DOCUMENTS

| | | |
|---|---|---|
| 2014/0158616 A1 | 6/2014 | Govind |
| 2015/0201657 A1 | 7/2015 | Johal |

FOREIGN PATENT DOCUMENTS

| | | |
|---|---|---|
| JP | 2006281193 A | 10/2006 |
| WO | 2006045795 | 5/2006 |

OTHER PUBLICATIONS

Desarnaud et al, Hopper Growth of Salt Crystals, : J. Phys. Chem. Lett. 2018, 9, 2961-2966 (Year: 2018).*

Ashokkumar, Muthupandian; "Influence of mixing and ultrasound frequency on antisolvent crystallisation of sodium chloride"; Ultrasonics Sonochemistry; Jan. 2014, pp. 60-68, vol. 21, Issue 1.

"Conductivity Guide"; Aug. 2013; 59 pages; Mettler-Toledo AG, Analytical; Schwerzenbach, Switzerland.

"Conductivity Theory and Practice"; 2004; 50 pages; Radiometer Analytical SAS; Villeurbanne Cedex, France.

Khan, Abdul; "Can surface energy be a parameter to define morphological change of rock-salt crystals with additives? A first principles study", CrystEngComm; Jan. 21, 2013; 9 pages; The Royal Society of Chemistry 2013;RSCPublishing.

Nowee, S. Mostafa; "Antisolvent crystallization: Model identification, experimental validation and dynamic simulation"; Chemical Engineering Science; Aug. 1, 2008; 11 pages; vol. 63; Sydney, Australia.

Sen, Anik; "Is Dual Morphology of Rock-Salt Crystals Possible with a Single Additive? The Answer is Yes, with Barbituric Acid"; Crystal Growth; Aug. 1, 2012; 6 pages; Angewandte Chemie International Edition 2012 vol. 51.

Takiyama, H.; "Morphology of NaCl Crystals in Drowning-Out Precipitation Operation"; Chemical Engineering Research and Design; Oct. 1998; 5 pages; vol. 76, Issue 7; Elesevier B.V.

Zhu, Ji-Ping; "Complex PbTe hopper (skeletal) crystals with high hierarchy"; Chemical Communications; Oct. 20, 2005; 3 pages; Issue 46.

Gustavo Cardona "Standard Test Method for Apparent Density of Free-Flowing Metal Powders Using the Hall Flowmeter Funnel" Oct. 2, 2014; section 4: summalry of test method (1 page).

PCT Search Report and Written Opinion for PCT/US18/57777 dated Feb. 25, 2019 (11 pages).

Raup, "Brine Mixing: an Additional Mechanism for Formation of Basin Evaporites," The American Association of Petroleum Geologists Bulletin, V. 54, No. 12 (Dec. 1970) pp. 2246-2259.

International Preliminary Report on Patentability, Appl. No. PCT/US2018/057777, dated Feb. 28, 2020.

* cited by examiner

- 702 — PROVIDING AN ANTISOLVENT SOLUTION
- 704 — PROVIDING A SALT SOLUTION
- 706 — ADDING THE SALT SOLUTION TO THE ANTISOLVENT SOLUTION TO FORM A SUPERSATURATED SOLUTION
- 708 — CRYSTALLIZING THE SUPERSATURATED SOLUTION TO FORM A SALT COMPOSITION

DISSOLUTION BEHAVIOR OF SALT CRYSTALS FORMED BY ANTISOLVENT CRYSTALLIZATION AS A FUNCTION OF PARTICLE SIZE

CRYSTAL MORPHOLOGY FOR SODIUM REDUCTION

BACKGROUND

Technical Field

Novel aspects of the present disclosure relate to a salt composition and a corresponding method of manufacture, and a resulting food product formed with the salt composition. More particularly, the present disclosure is directed to a novel salt composition with a unique morphology that increases its perceived saltiness.

Background

Although salt is a popular and effective seasoning, in recent years, some consumers have expressed a preference for food products having reduced levels of sodium. To address these changing preferences, snack food manufacturers have applied a number of different methods for reducing sodium content. In one simple method, snack food recipes have been modified to use less salt. However, such changes often result in an undesirable taste profile. Consequently flavor rebalancing is often utilized in combination with sodium reduction, which attempts to mask the reduced saltiness with other flavors. Sodium contrast is yet another method of sodium reduction, which relies on consumption of two differently salted portions to increase perceived saltiness when compared to consumption of uniformly salted food portions. However, these currently used methods suffer from various drawbacks, including but not limited to undesirable changes in taste, increased cost, and/or complexity. Thus, a need still exists in the art for reducing the sodium content of savory food products without reducing its perceived saltiness or otherwise diminishing consumer perception of the product.

SUMMARY OF THE INVENTION

Novel aspects of the present invention are directed to a salt product and a corresponding method of manufacture for reducing sodium content. In one embodiment, a salt composition is disclosed which is formed from a plurality of salt crystals with a surface area of at least 0.19-0.23 $m^2/g$ and a Hall density of less than 0.8 $g/cm^3$. In some embodiments, at least a portion of the salt composition has a hopper cube morphology.

In another embodiment, a method of manufacturing a salt product is disclosed which includes the steps of providing an antisolvent solution; adding a salt solution to the antisolvent solution to form a supersaturated solution, wherein the salt solution has a concentration greater than 15 wt % solute, and wherein the mass ratio of the salt solution to antisolvent solution is in the range of 1:20 to 1:1.25; and crystallizing the supersaturated solution to form the salt composition with a plurality of salt crystals with a surface area of at least 0.19-0.23 $m^2/g$ and a Hall density of less than 0.8 $g/cm^3$.

In yet another embodiment, a food product is disclosed which includes an outer surface, and a salt composition applied to the outer surface, wherein the salt composition comprises a plurality of salt crystals with a surface area of at least 0.19-0.23 $m^2/g$ and a Hall density of less than 0.8 $g/cm^3$.

Other aspects, embodiments and features of the invention will become apparent from the following detailed description of the invention when considered in conjunction with the accompanying figures. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE FIGURES

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying figures, wherein:

DETAILED DESCRIPTION

Figure 1:
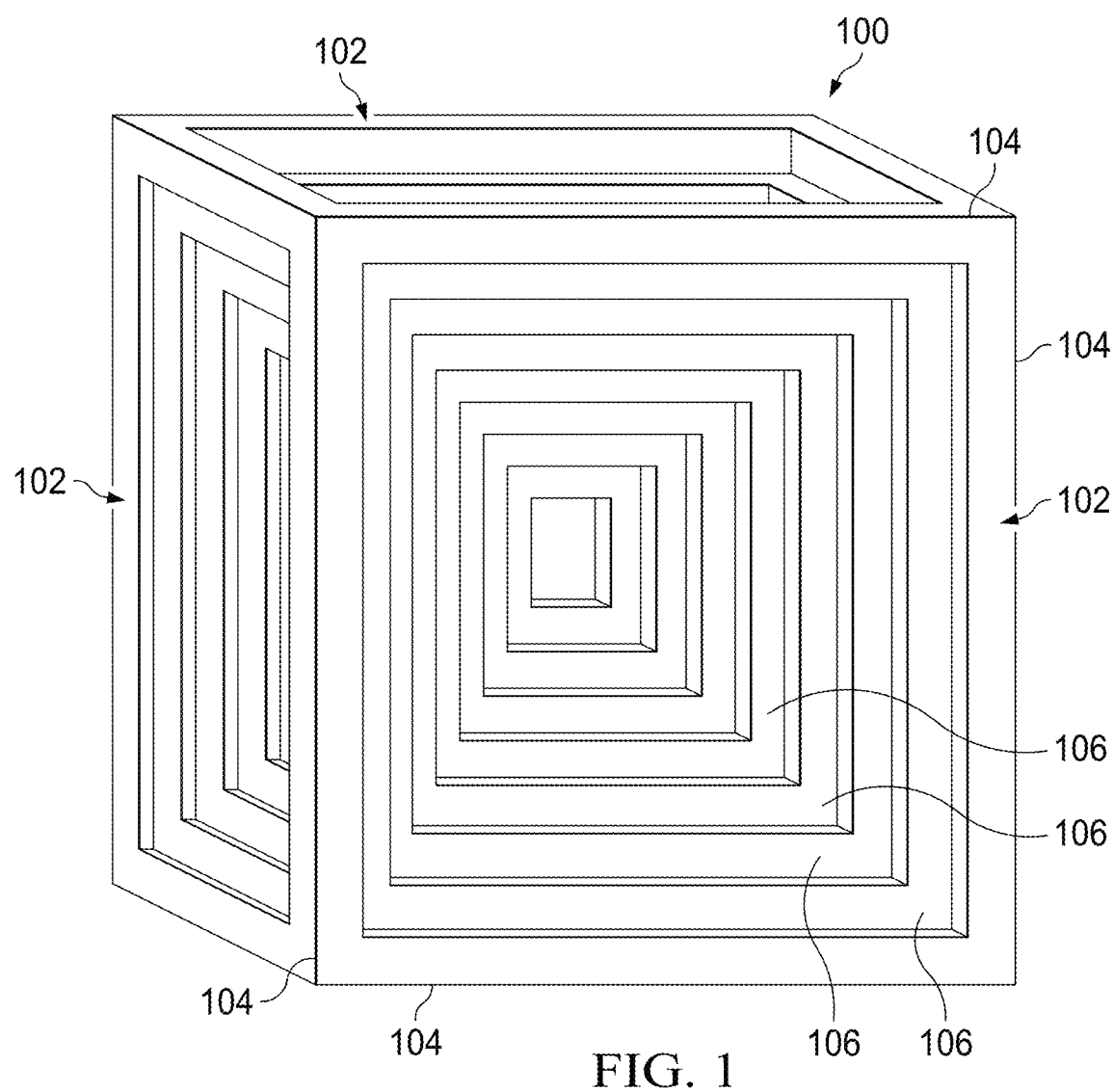
FIG. 1 is a drawing depicting a salt crystal with a hopper cube morphology in accordance with an illustrative embodiment.

Salt is an important ingredient in food products, and particularly important in savory snacks such as potato chips, pretzels, and tortilla chips. Traditional salt crystals are relatively large, solid cubes that range in size from 45-600 μm. Due to their size and morphology, traditional salt crystals only partially dissolve in the mouth during consumption so that the majority of salt is swallowed without contributing to the perceived saltiness of the food product. Thus, at least one previous attempt at reducing sodium content involved finely granulating the salt crystals to increase dissolution rate of the applied salt in the mouth, which resulted in an increased perception of saltiness. However, widespread use of finely granulated salt is limited by the ability to apply the salt using conventionally available equipment. Smaller salt particles do not readily flow and as a result, finely granulated salt particles cannot be applied using conventionally available equipment. Further, salt applied as seasoning on savory snacks are often adhered to the food product with a layer of oil, and exceedingly small salt crystals that are fully submerged within the layer of oil are believed to have a reduced contribution to perceived saltiness.

Accordingly, novel aspects of the illustrative embodiments disclosed herein recognize a need for creating a salt product with an increased perceived saltiness, which can be applied to food products at a lower concentration to achieve similar levels of saltiness, but which can be applied using conventionally available equipment. In particular, the disclosure is directed to a salt composition and an accompanying method of manufacture that creates a salt product with salt crystals having a particular morphology that increases its dissolution rate so that the applied salt may be perceived as saltier than conventionally available salt crystals.

Salt crystal morphology can be modified with antisolvent crystallization, which is a method of forming salt crystals by mixing a salt solution with an antisolvent. The antisolvent is a solution that reduces the solubility of the solute in the salt solution. When combined with a salt solution, the resultant mixture forms a supersaturated solution with a supersaturation driving force that causes crystallization. The supersaturation driving force is the difference in chemical potential between a molecule in solution and the chemical potential of a molecule in the bulk of the crystal phase. In a non-limiting example, where ethanol is the antisolvent and aqueous sodium chloride is the salt solution, antisolvent crystallization proceeds according to the following formula:

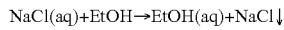

Salt crystal morphology from antisolvent crystallization is highly process-specific. Thus, size and shape of salt crystals formed by antisolvent crystallization are affected by a number of different variables including concentration of salt in the salt solution, alcohol content in the antisolvent solution, presence of additives, and mixing conditions. Mixing condition variables can be further broken down into mixing temperature and stirring rate. The effect of each of these variables were considered in turn to determine a corresponding effect on salt crystal morphology and ultimately on perceived saltiness. As will be discussed in more detail below, selection of certain variables resulted in the creation of a salt crystal with a hopper cube morphology that provided an increased dissolution rate as compared with other conventionally available salt crystals.

FIG. 1 is an illustration of a salt crystal with a hopper cube morphology in accordance with an illustrative embodiment. As used herein, a salt crystal with a hopper cube morphology may be referred to in the alternative as a hopper cube. Hopper cube 100 can be described as a cube-shaped crystal with six faces 102, each of which has four edges 104 generally defining a square. Each face 102 has a set of square-shaped steps 106 receding inwardly into each face 102. When compared with a traditional salt crystal having the same outer dimensions, the hopper cube 100 has a larger surface area than a traditional salt crystal but a lower density. As a result, the hopper cube 100 has a faster dissolution rate than a traditional salt crystal with the same dimensions.

Hopper cubes are formed when a crystal grows faster at the edges than at the center of the crystal face. Crystal growth rate is determined by a supersaturation driving force—a higher supersaturation leads to rapid nucleation and dendritic growth (i.e., faster edge growth). The solute concentration and the supersaturation driving force are highest when the salt solution and the antisolvent are first mixed, resulting in the formation of crystals with more elaborate morphologies, such as hopper cubes. As the solute concentration decreases, the supersaturation force decreases, slowing the rate of crystal growth, which allows the faces of the crystals to fill in. Accordingly, crystals formed from antisolvent crystallization have a range of sizes and morphologies, as can be seen in more detail in FIG. 2.

Because salt content in the salt solution contributes to the supersaturation driving force of the supersaturated solution, salt content was varied to determine corresponding effects on salt crystal morphology. Specifically, salt solutions having various concentrations were prepared using sodium chloride dissolved in water according to the following equation:

$$\text{salt concentration} = \frac{\text{weight of salt (g)}}{\text{weight of salt solution (g)}} \times 100$$

Using the equation above, salt solutions of 15 wt %, 20 wt %, and 25 wt % were prepared and each was mixed with an antisolvent solution of 95 vol % ethanol to form salt crystals. The resultant crystal morphologies were analyzed. The 15 wt % salt solution was not sufficiently saturated to produce salt crystals. Although both the 20 wt % salt solution and the 25 wt % salt solution produced hopper cubes, the 25 wt % salt solution produced salt crystals with a broader size range and the formation of complex hopper cubes, as can be seen in FIG. 2.

For cube-shaped crystals, size was determined by measuring along an edge of a salt crystal from one corner to an adjacent corner. In the event that the salt crystal lacked a clearly defined edge, as is evident in complex hopper cubes, size was determined by measuring the length between two adjacent corners of a hypothetical cube sized to circumscribe the entire cube-shaped crystal.

Figure 2A:
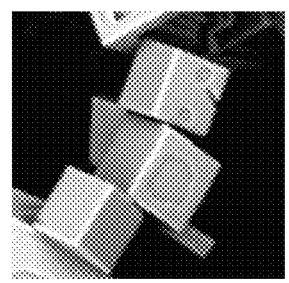
FIGS. 2a-2e are micrographs depicting representative crystal morphologies formed by antisolvent crystallization in accordance with an illustrative embodiment.
Figure 2B:
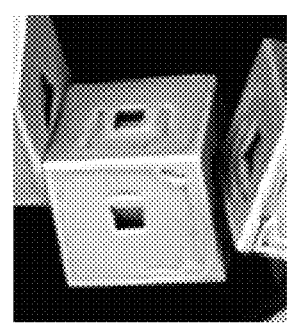
Figure 2C:
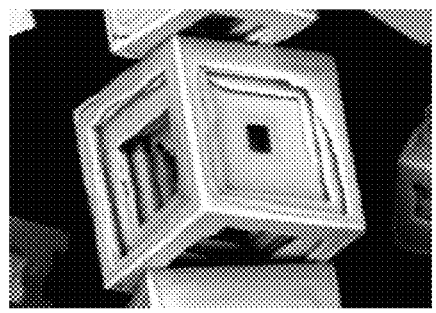
Figure 2D:
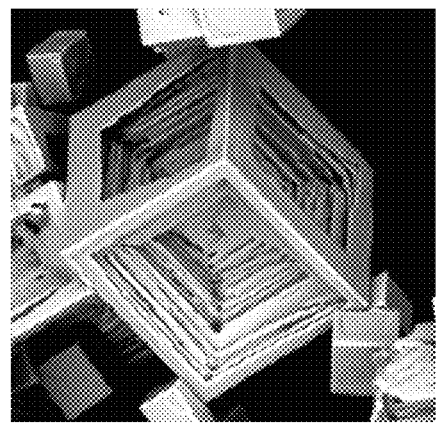
Figure 2E:
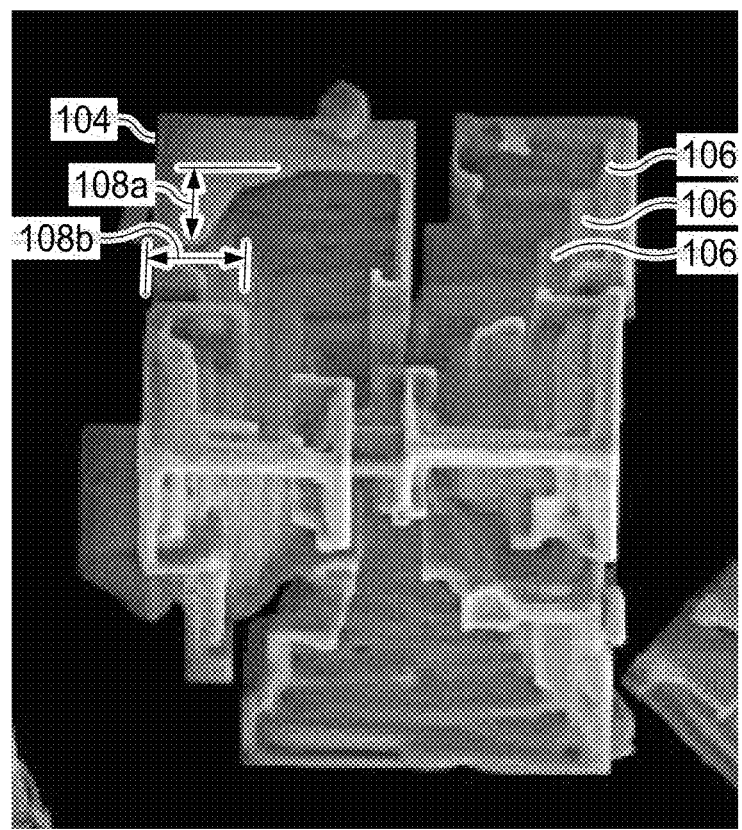

FIGS. 2a-2e are micrographs depicting representative crystal morphologies formed by antisolvent crystallization in accordance with an illustrative embodiment, shown in order of increasing complexity. FIG. 2a depicts a representative solid cube that has a size of about 20 μm, but may range in size from 10-30 μm. The surfaces of the solid cubes may have irregular-shaped patterns. FIG. 2b depicts a representative hollow cube that has a size of less than 50 μm, but more specifically a size in the range between 30-50 μm. The hollow cube has generally flat faces (i.e., lacks square-shaped steps) with a hole in the center of one or more of the faces. FIG. 2c depicts a representative simple hopper cube formed by antisolvent crystallization. The simple hopper cube has six faces, each of which has four straight edges, and one or more square-shaped steps receding inwardly into each face. Additionally, the simple hopper cube has a size that is less than 100 μm, but more specifically a size in the range between 50-100 μm. FIG. 2d depicts a representative mature hopper cube. The mature hopper cube has six faces, each of has four straight edges, and a plurality of square-shaped steps receding inwardly into each face. Additionally, the mature hopper cube has a size that is greater than 100 μm, but more specifically a size in the range between 100-150 μm. FIG. 2e depicts a representative complex hopper cube formed by antisolvent crystallization. The complex hopper cube is a generally cube-shaped crystal with a size that is smaller than 150 μm, and more particularly a size in the range between 80-150 μm. The complex hopper cube differs from the simple hopper cube and the mature complex hopper cube in that the complex hopper cube lacks the defined, uninterrupted edges that extend from corner to corner. Instead, the complex hopper cubes are generally cubic crystals with one or more edges that have at least two directions of growth. For example, complex hopper cube in FIG. 2e has an edge 104 that has a direction of growth along line 108a and another direction of growth along the line 108b.

In the absence of mixing or increased temperature, when 25 wt % salt solution is mixed with an antisolvent formed from 95 vol % ethanol, the higher supersaturation driving force results in the formation of complex hopper cubes shown in FIG. 2e, as well as the range of crystals morphologies depicted in FIG. 2a-2d. In the absence of mixing or increased temperature, when the 20 wt % salt solution is mixed with an antisolvent, the relatively lower supersaturation driving force is insufficient to create complex hopper cubes, but instead form crystals with morphologies that range from the mature hopper cubes of FIG. 2d to the solid cubes in FIG. 2a.

Figure 3A:
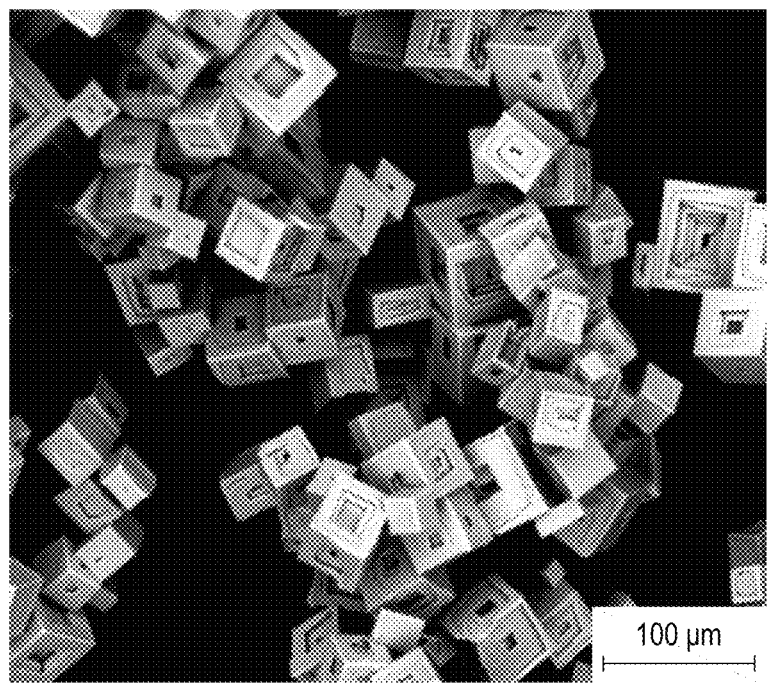
FIGS. 3a and 3b are micrographs depicting representative samples of salt crystals formed from salt solutions with varying salt concentrations.
Figure 3B:
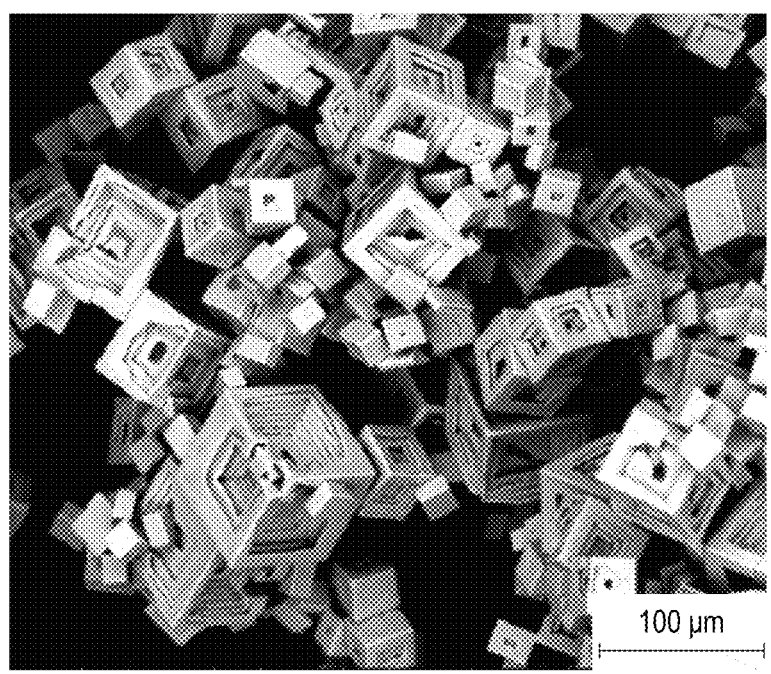

As an example, FIGS. 3a and 3b are micrographs depicting representative samples of salt crystals formed from salt solutions with varying salt concentrations. FIG. 3a shows salt crystals formed from a salt solution with 20 wt % salt, and FIG. 3b shows salt crystals formed from a salt solution with 25 wt % salt.

Accordingly, in an illustrative embodiment, a salt solution of greater than 15 wt % solute can be added to an antisolvent to create hopper crystals by way of antisolvent crystallization. In another embodiment, the salt solution is greater than 15 wt % but less than 27 wt % solute to achieve salt crystals with hopper cube morphologies.

Having established that salt content of a salt solution affects salt crystal morphology and that 25 wt % salt solution yielded hopper cubes, the alcohol content of the antisolvent solution was varied to determine a corresponding effect on crystal morphology. In a non-limiting embodiment, the antisolvent solution includes ethanol, the amount of which was varied as indicated below. When 15 g of 25 wt % salt solution was mixed with 150 g of 100 vol % ethanol (i.e., 200 proof ethanol), salt rapidly nucleates at the interface between the antisolvent and the salt solution, resulting in the formation of a high number of small salt crystal nuclei with a size of about 5 μm. These fine particles agglomerated into a cake after drying and were not easily separated into individual particles. However, when the same salt solution was poured into 150 g of 95 vol % ethanol, salt crystals were obtained which included hopper cubes that ranged in size from 30-150 μm along with some solid cubes of about 20 μm. The results of this experiment are shown in FIG. 4.

Figure 4A:
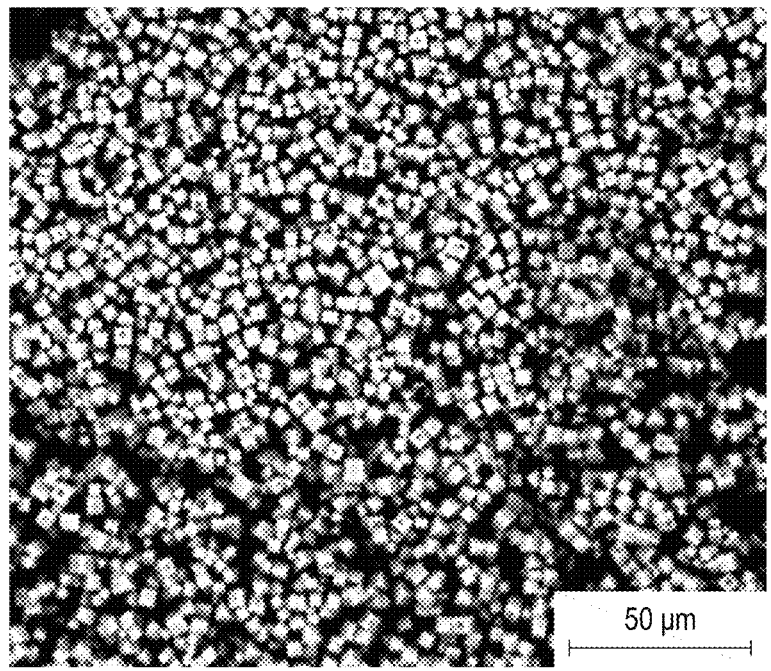
FIGS. 4a and 4b are micrographs depicting representative samples of salt crystals formed from antisolvents with varying ethanol concentrations.
Figure 4B:
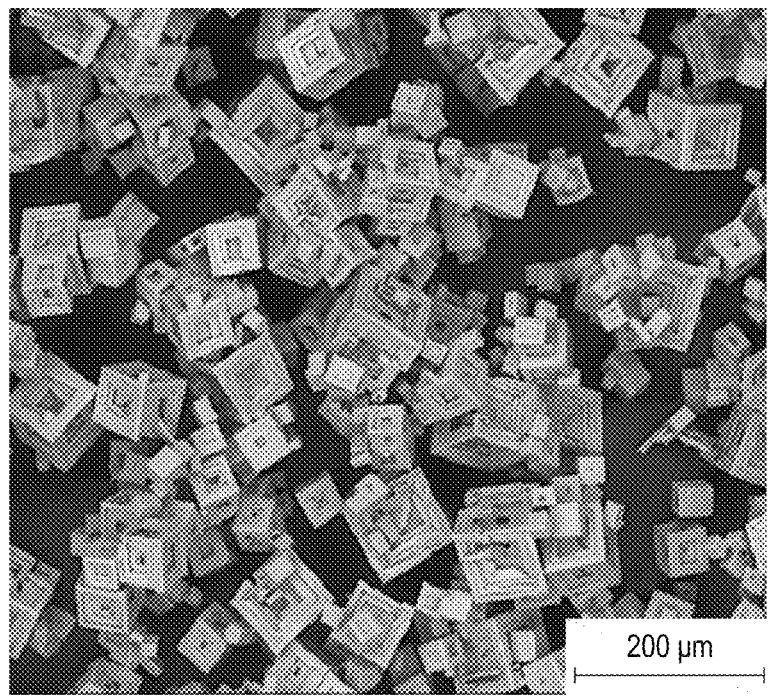

FIGS. 4a and 4b are micrographs depicting representative samples of salt crystals formed by antisolvent crystallization with varying ethanol concentrations. In particular, FIG. 4a depicts salt crystals formed from the mixture of 15 g of 25 wt % salt solution with 150 g of 100 vol % ethanol, and FIG. 4b depicts 15 g of 25 wt % salt solution mixed with 150 g of 95 vol % ethanol in water. As previously discussed, salt crystals formed from 100 vol % ethanol yields small, crystal nuclei, whereas salt crystals formed from 95 vol % ethanol yielded a range of crystal morphologies ranging from hopper cubes to solid cubes.

Thus, in a non-limiting embodiment, the antisolvent crystallization method utilizes an antisolvent that is less than 100 vol % ethanol (i.e., less than 200 proof ethanol). In another embodiment, the antisolvent solution has ethanol in the range greater than 80 vol % but less than 100 vol % ethanol in water, and in a more specific embodiment, the antisolvent is a solution that is 95 vol % ethanol in water.

Salt crystals with hopper cube morphology was obtained by mixing the salt solution with the antisolvent as described above at mass ratio of salt solution to antisolvent in the range of 1:20 to 1:1.25, but more specifically in the range between 1:10 to 3:5, inclusive.

Mixing condition variables can be further broken down into mixing temperature and stirring rate. Although mixing temperature has an effect on solubility and rates of reaction, temperature was maintained at around room temperature, between 20-30° C., and more specifically around 25° C. (298K) so that the method for manufacturing salt crystals with a hopper cube morphology would not require the use of heat exchangers that would increase the complexity and cost of manufacture. Accordingly, while maintaining the mixing temperature at room temperature, stirring rate was varied to determine the corresponding effect on crystal morphology.

To test the effect of mixing speed on salt crystal morphology, 30 g of 25 wt % salt solution was mixed with an antisolvent formed from 100 g 95 vol % ethanol while stirred. Stirring was accomplished with a conventional magnetic stir bar. In a first test, the salt solution was mixed with the antisolvent and stirred at 125 RPM. In a second test, the salt solution was mixed with the antisolvent and stirred at 1100 RPM. The results are depicted in FIG. 5.

Figure 5A:
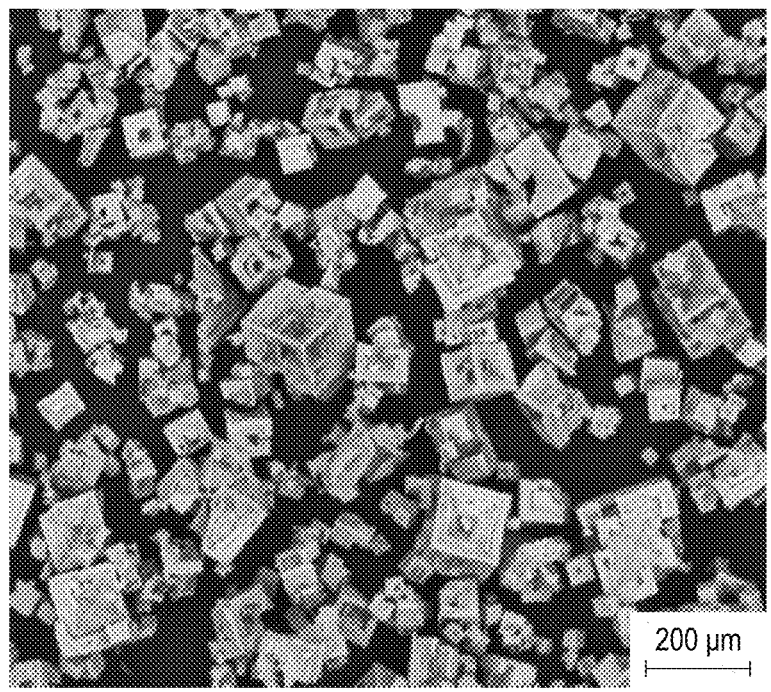
FIGS. 5a and 5b are micrographs depicting representative samples of salt crystals formed from supersaturated solutions exposed to varying stirring rates.
Figure 5B:
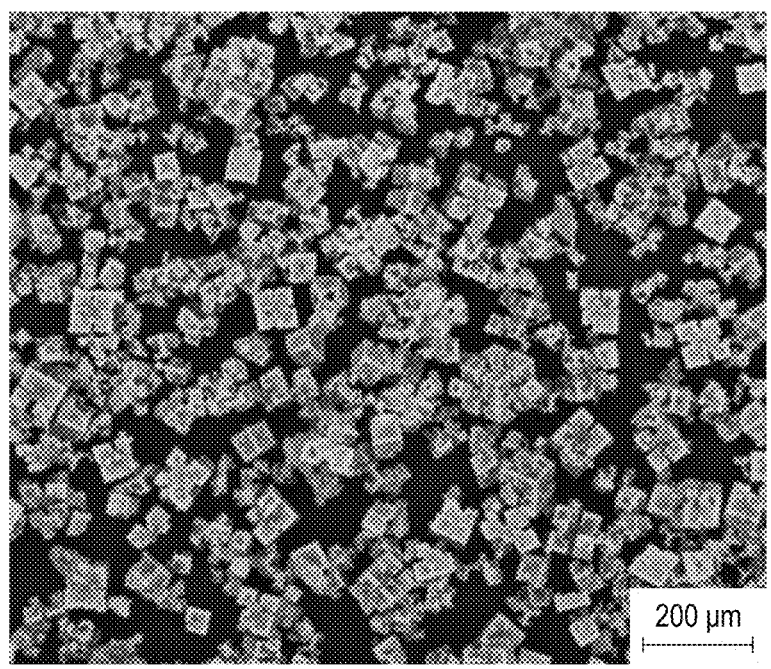

FIGS. 5a and 5b are micrographs depicting representative samples of salt crystals formed from supersaturated solutions exposed to varying stirring rates. FIG. 5a depicts salt crystals formed with stirring at 125 RPM, and FIG. 5b depicts salt crystals formed with stirring at 1100 RPM. When compared to salt crystals formed in an antisolvent crystallization method that was devoid of mixing, stirred samples yielded smaller cubes, but a larger number of complex hopper cubes. The increased stirring rate likely increases the probability of contact between the solute molecules, permitting faster crystal growth that is associated with the formation of complex hopper cubes. The sizes of the hopper cubes ranged from 40-120 μm. Smaller crystal sizes were observed at the highest mixing rate, which could be attributed at least in part to breakage during stirring.

Accordingly, in one embodiment, an antisolvent crystallization method is disclosed that includes a mixing step where the supersaturated solution formed from an antisolvent and a salt solution is stirred with a magnetic stir bar rotating at less than 1100 RPM. In another embodiment, the magnetic stir bar rotates at 125 RPM or less so that larger crystals may be obtained. In a final embodiment, a salt solution is mixed with an antisolvent in the absence of mixing so that the largest possible salt crystals may be obtained.

Additives may also be introduced to the salt solution before combining with antisolvent. The additives alter salt crystal morphology by acting as capping agents that change the surface free energies of crystal faces via adsorption and/or chemical interaction. The following additives were investigated to determine their effects on crystal morphology: potassium chloride (KCl), sodium alginate (Na $(C_6H_8O_6)_n$), citric acid ($C_6H_8O_7$), tri-calcium phosphate ($Ca_3(PO_4)2$), barbituric acid ($C_4H_4N_2O_3$), glycine ($C_2H_5NO_2$), sodium citrate ($HOC(COONa)(CH_2COONa)_2$), and calcium lactate ($C_6H_{10}CaO_6$). Of these, barbituric acid, glycine, and sodium citrate were shown to alter salt crystal morphology at 0.5 wt % of the mass of salt in the salt solution, the results of which are shown in FIG. 6.

Figure 6A:
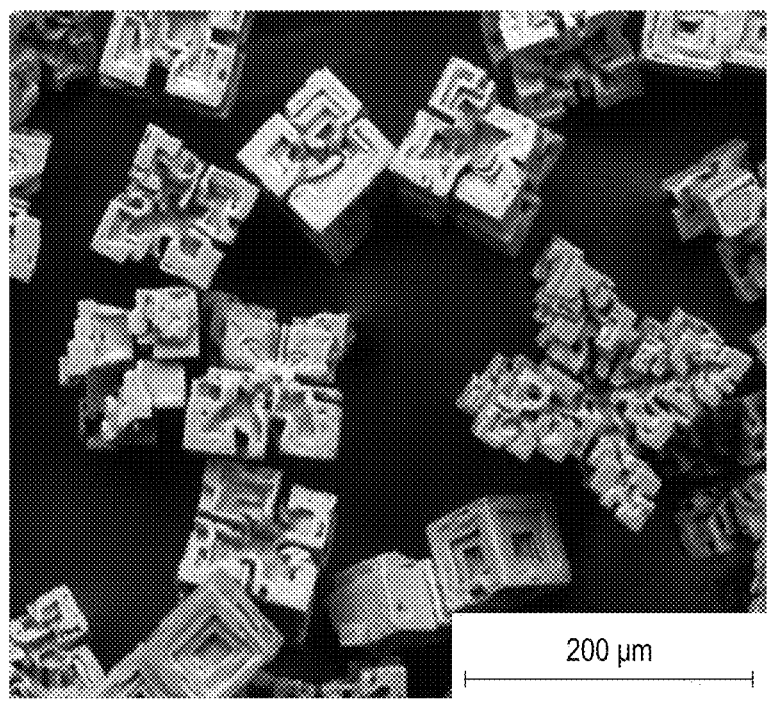
FIG. 6a-6f are micrographs depicting representative samples of salt crystals formed in the presence of salt solution additives.
Figure 6B:
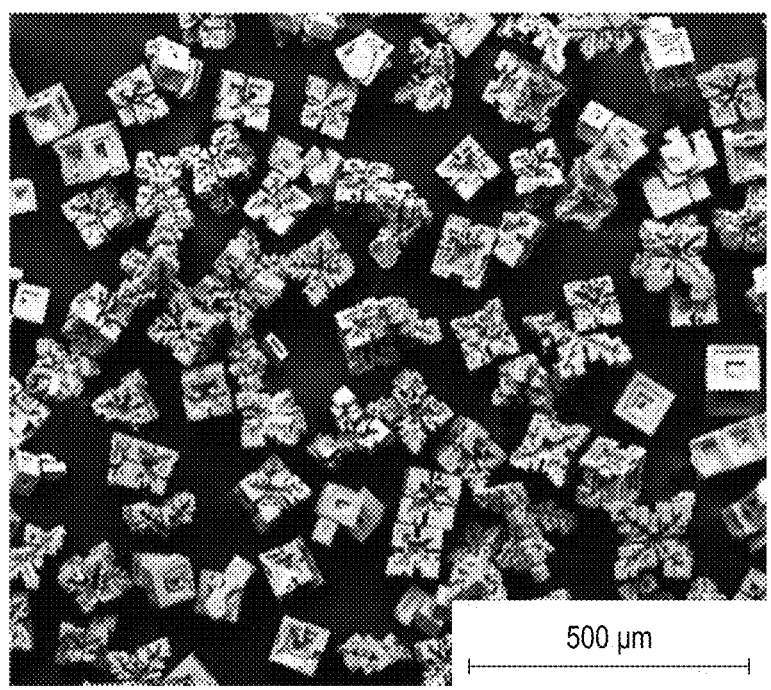

FIG. 6a-6f are micrographs depicting representative samples of salt crystals formed in the presence of salt solution additives. Modified salt solutions were formed by mixing one of the additives at 0.5 wt % into 30 g of 25 wt % salt solution. The modified salt solution was then combined with 100 g of 95 vol % ethanol at room temperature in the presence of mild stirring. FIGS. 6a and 6b show the crystals formed when barbituric acid was mixed into the salt solution prior to combination with antisolvent. The salt crystals include solid cubes, hollow cubes, simple hopper cubes, complex hopper cubes, and also horned cubes. The horned cube is a crystal that has eight horn-like structures, each of which extend from the center of the crystal structure to a different corner of a hypothetical cube drawn to circumscribe the crystal structure. The horned cube is formed when the supersaturation driving force is the highest, which is evident by the complexity of the dendritic formations. As the solute is consumed and the supersaturation force decreases, the complex hopper cubes, mature hopper cubes, simple hopper cubes, hollow cubes, and solid cubes are formed, each in turn.

Figure 6C:
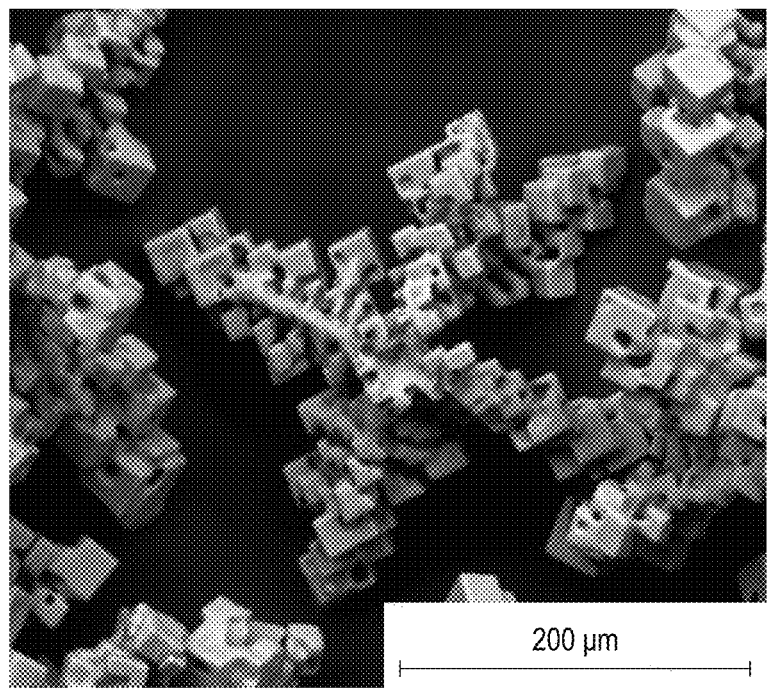
Figure 6D:
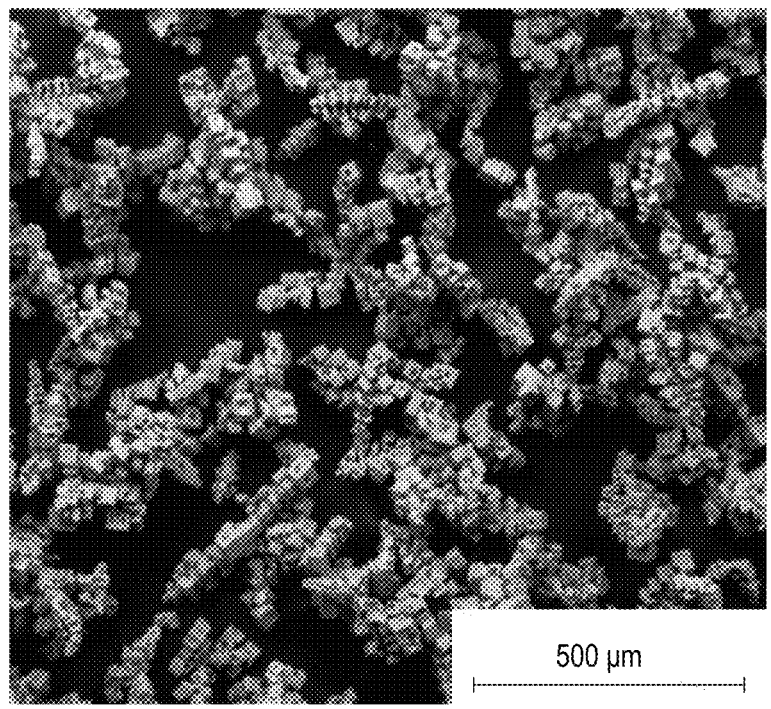

FIGS. 6c and 6d show the crystals formed when glycine is added into the salt solution prior to combining with antisolvent. The resultant crystals may be generally described as agglomerations of smaller cubes that form strands or clumps of cubes. The smaller cubes may include solid cubes, hollow cubes, and simple hopper cubes.

Figure 6E:
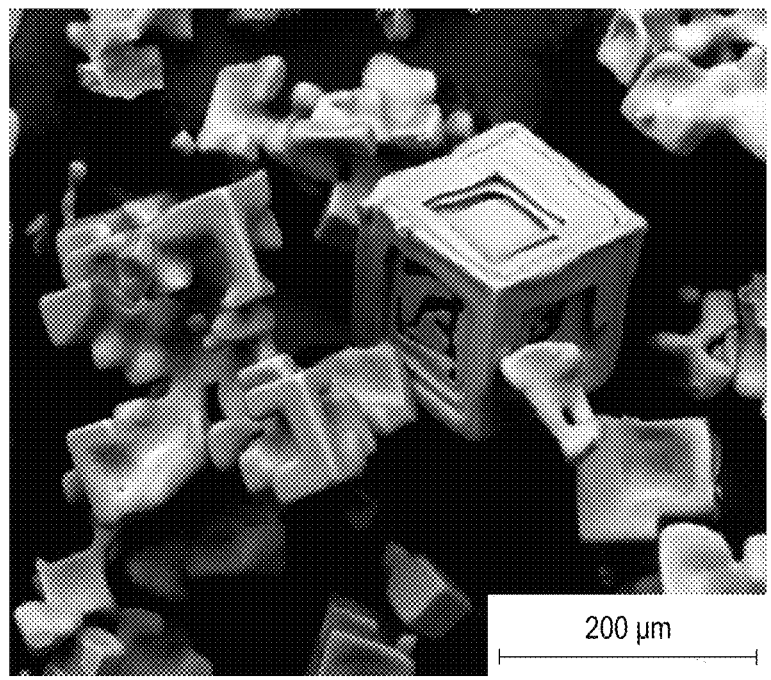
Figure 6F:
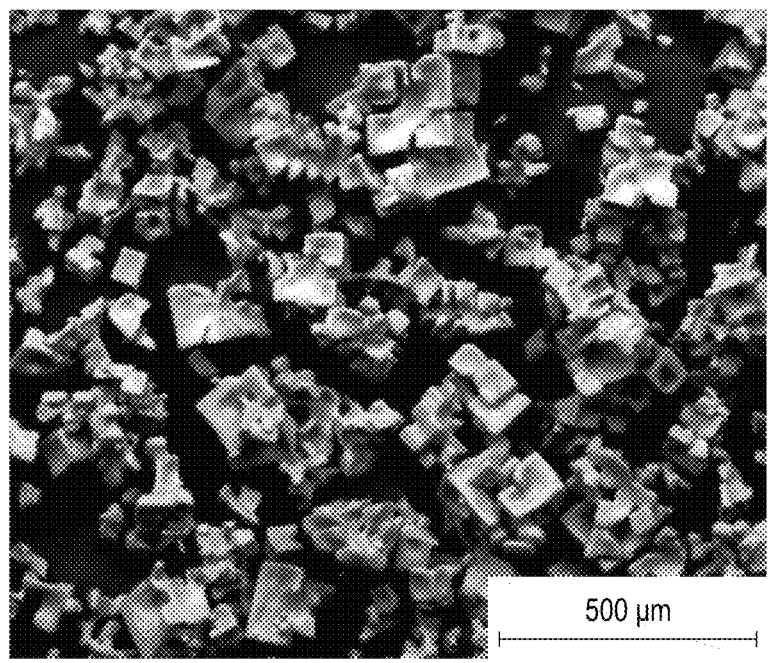

FIGS. 6e and 6f show the crystals formed when sodium citrate is added into the salt solution prior to combination with antisolvent. The resultant crystals may be generally described as rounded versions of crystals formed in the absence of sodium citrate. Thus, the cubes may be described as resembling solid cubes, hollow cubes, simple hopper cubes, and complex hopper cubes, but with rounded edges and curved, concave surfaces instead of square-shaped steps.

Figure 7:
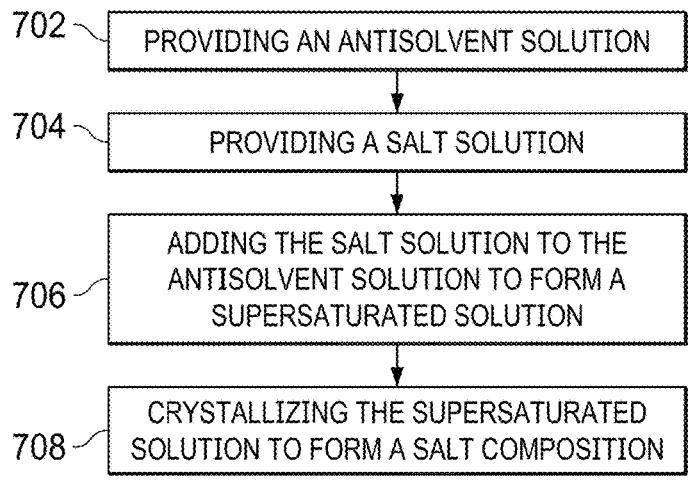
FIG. 7 is a flowchart of a process for forming a salt composition in accordance with an illustrative embodiment.

FIG. 7 is a flowchart of a process for forming a salt composition in accordance with an illustrative embodiment. In a first step, an antisolvent solution is provided (Step 702). In a non-limiting embodiment, the antisolvent solution is ethanol that is less than 200 proof (less than 100 vol % ethanol), and in another embodiment, the ethanol is between 180 and 200 proof (between 90-100 vol % ethanol). At least one exemplary embodiment uses an antisolvent solution that is 190 proof (95 vol %) ethanol.

In a second step, a salt solution is provided (Step 704). The salt solution is formed from a solute dissolved in a solvent, combined at room temperature and mixed until all solute particles are fully dissolved. Room temperature may range from 293-303K (20-30° C.). In one embodiment, the solute is present in an amount greater than 15 wt % of the salt solution. In another embodiment, the solute is between 15-27 wt % of the salt solution. In the exemplary embodiment disclosed, the solute includes sodium chloride and the solvent is water.

In some embodiments, the solute may include other additives in an amount between 0.3-0.8 wt % of the sodium chloride. An exemplary embodiment includes one or more additives in an amount of about 0.5 wt % of the sodium chloride.

The salt solution is added to the antisolvent solution to form a supersaturated solution (Step 706). The salt solution may be added to the antisolvent solution at a weight ratio between 1:20 to 1:1.25, at room temperature. In this step, the mixing of the salt solution and the antisolvent solution may be achieved in the absence of stirring. In an alternative embodiment, addition of the salt solution to the antisolvent solution may be accomplished in the presence of stirring. Stirring may be achieved by a magnetic stir bar rotating at less than 1100 RPM, and in some embodiments the magnetic stir bar rotates at 125 RPM or less.

The supersaturated solution is crystallized to form a salt composition (Step 708). In one embodiment, the supersaturated solution is crystallized for a time between 5-15 minutes, and in one particular embodiment the supersaturated solution is crystallized for approximately 10 minutes. The salt composition includes hopper cube salt crystals. Optionally, the salt composition may be subjected to post-processing steps, which may include drying the salt composition using conventional methods including but not limited to vacuum filtration and separation into one or more size-based fractions. In addition, the steps of the method described above are carried out at room temperature, e.g., between 20° C.-30° C., to eliminate the additional cost and complexity that would be associated with the utilization of heating elements.

The salt composition formed from antisolvent crystallization may be applied to a food product to achieve a desired level of saltiness. Alternatively, the salt composition may be separated into two or more fractions based on size so that the salt composition added to the food product may include salt crystals from a particular size range, or from a combination of two or more size ranges. The food product may be a salty snack, such as potato chips, pretzels, or tortilla chips with a relatively low moisture content, generally less than 5 wt %. The low moisture content limits the dissolution of the salt crystals in the salt composition, preserving the salt crystal morphology with the increased dissolution rate. In a non-limiting embodiment, the salt composition is applied to the exterior surface of the food product to form a salted food product. Because the morphology of the salt crystal described herein increases the dissolution rate, the salted food product requires less salt to achieve the same level of saltiness than conventionally available salts. The comparative examples discussed below as evidence in support of the increased dissolution rate of the novel salt composition described herein.

COMPARATIVE EXAMPLES

Salt crystals were formed by antisolvent crystallization and compared with conventionally available salt. The antisolvent crystallization method used to form the salt composition in Table 1 included the steps of mixing 25 wt % salt solution into a 95 vol % ethanol salt solution at room temperature and in the absence of mixing. The resultant supersaturated solution was allowed to crystallize for about 10 minutes, and the resultant salt composition was filtered out and dried for 12 hours at 120° C. and above 25 inches of mercury. The salt composition formed from antisolvent crystallization was characterized using the following conventional Designer Salt Testing Protocols: Hall density (ASTM Standard B212-99), bulk density (ASTM Standard B527-06) and flowability (ASTM standard B213-03, Method 1), and surface area (Brunauer-Emmett-Teller method using ASAP 2020 automated surface area instruments). These results were compared with conventionally available salt: "15-micron salt," Alberger Select Salt, Alberger Fine Flake Salt, and pure salt. Table 1 lists the results of that test.

TABLE 1

Characterization of Salt Particles

| Salt Type | Surface Area (m²/g) | Particle shape (size in μm) | Bulk Density (g/cm³) | Hall Density (g/cm³) | Flowability (g/s) |
|---|---|---|---|---|---|
| 15-Micron | 0.70 | Small cube (1-5); agglomerated cube assembly (45-600) | 0.91 | No Flow | No Flow |
| Hopper Cube | 0.21 | Hopper cubes (50-250); hollow cubes (30-50); solid cubes (~20) | 0.85 | 0.74 | 0.21 |
| Alberger Select | 0.18 | Cube (30-80); cube assembly (90-425); irregular plate (150-600) | 0.94 | 0.84 | 0.39 |
| Alberger Fine Flake | 0.14 | Cube agglomerates (45-250); plate/flake (250-600) | 1.04 | 0.87 | 0.30 |
| Pure | 0.07 | Solid cubes (45-600) | 1.37 | 1.32 | 0.49 |

The salt crystals with the hopper cube morphology had the lowest bulk density of all the salts but the second highest surface area, behind only the 15-micron salt. The high surface area of the 15-micron salt is attributed to the portion of crystals with the small cube morphology. However, the small cubes of the 15-micron salt crystals negatively impacted the flowability of the salt composition. Larger surface area contributes to higher dissolution rates.

The dissolution rate of the hopper cube salt crystals were measured and compared with the dissolution rates for 15-micron salt, Alberger Select salt, Alberger Fine Flake, and pure salt. Dissolution is the process by which a solid substance, such as salt crystals, become solutes in a solution, such as water. Dissolution rate is dependent upon a number of factors including temperature, agitation rate, and surface area of particles. Smaller particles dissolve faster than larger particles. Accordingly, dissolution rate was determined for salt particles separated into the following particle size ranges: 45-90 μm, 90-150 μm, 150-212 μm, 212-250 μm, and 250-300 μm.

The dissolution rates were determined by measuring electrical conductivity of various salt compositions dissolved in an artificial saliva based on the theory that the dissolution of salt changes the ionic conductivity of the solution, which can be measured to quantify the rate of dissolution. Electrical conductivity is the ability of a solution to conduct an electrical current, which is attributable to the presence of dissolved solids which have been ionized in a polar solution, like water. Conductivity can be measured by applying an alternating electrical current to two electrodes immersed in a solution and measuring the resulting voltage. Conductivity experiments described herein were performed at room temperature using Thermo Scientific™ Orion™ Star A222 Conductivity Portable Meter.

The composition of the artificial saliva solution was mixed according to the Table 2.

TABLE 2

Artificial Saliva Composition

| Ingredient | Buffer (g) | Artificial Saliva (g) |
|---|---|---|
| Sodium Bicarbonate NaHCO₃ | 5.208 | 5.208 |
| Potassium phosphate dibasic trihydrate K₂HPO₄·3H₂O | 1.369 | 1.369 |
| Sodium Chloride NaCl | 0.877 | 0.877 |
| Potassium Chloride KCl | 0.477 | 0.477 |

TABLE 2-continued

Artificial Saliva Composition

| Ingredient | Buffer (g) | Artificial Saliva (g) |
|---|---|---|
| Sodium Carboxyl Methyl Cellulose Na-CMC | | 10 |
| De-ionized water | 1000 | 1000 |

Salt particles were oven dried at 120° C. for 2 hours, then cooled to room temperature and maintained in a desiccator before the conductivity tests were performed. Three trials were conducted for each salt at each salt particle size range. For each trial, 40 mg of salt was dissolved in 80 g of artificial saliva at room temperature while stirring with a magnetic stir bar rotating at 900 RPM. Results are shown in Tables 3-6.

Tables 3-6 compare the dissolution rate of the conventionally available salts listed out in Table 1 with the novel antisolvent salt composition described herein. More specifically, Tables 3-7 compare times required to dissolve 50% of a salt sample ($t_{50\%}$), 80% of the salt sample ($t_{80\%}$), 90% of the salt sample ($t_{90\%}$), and 100% of the salt sample ($t_{100\%}$).

TABLE 3

$t_{50\%}$ for Selected Salt Compositions

| Particle Size (μm) | Pure Salt | Alberger Select | 15-micron | Alberger Fine Flake | Antisolvent Salt |
|---|---|---|---|---|---|
| 45-90 | 0.5 s | 0.7 s | n/a | n/a | 0.5 s |
| 90-150 | 0.8 s | 0.7 s | n/a | 1.0 s | 0.5 s |
| 150-212 | 1.0 s | 0.7 s | 0.3 s | 0.9 s | 0.5 s |
| 212-250 | 1.2 s | 0.8 s | 0.5 s | 1.1 s | 0.5 s |
| 250-300 | 1.8 s | 0.8 s | 0.7 s | n/a | 0.7 s |
| 300-425 | 2.5 s | 1.0 s | 1.0 s | n/a | 0.8 s |
| 425-600 | 3.5 s | n/a | 1.3 s | n/a | n/a |

TABLE 4

$t_{80\%}$ for Selected Salt Compositions

| Particle Size (μm) | Pure Salt | Alberger Select | 15-micron | Alberger Fine Flake | Antisolvent Salt |
|---|---|---|---|---|---|
| 45-90 | 0.8 s | 1.3 s | n/a | n/a | 1.1 s |
| 90-150 | 1.2 s | 1.1 s | n/a | 1.7 s | 1.1 s |
| 150-212 | 2.0 s | 1.4 s | 0.8 s | 1.6 s | 1.2 s |
| 212-250 | 2.5 s | 1.7 s | 1.5 s | 1.7 s | 1.3 s |

TABLE 4-continued $t_{80\%}$ for Selected Salt Compositions

| Particle Size (μm) | Pure Salt | Alberger Select | 15-micron | Alberger Fine Flake | Antisolvent Salt |
|---|---|---|---|---|---|
| 250-300 | 4.0 s | 1.7 s | 1.5 s | 2.0 s | 1.5 s |
| 300-425 | 6.0 s | 2.1 s | 2.0 s | n/a | 2.0 s |
| 425-600 | 7.5 s | n/a | 2.8 s | n/a | n/a |

TABLE 5

$t_{90\%}$ for Selected Salt Compositions

| Particle Size (μm) | Pure Salt | Alberger Select | 15-micron | Alberger Fine Flake | Antisolvent Salt |
|---|---|---|---|---|---|
| 45-90 | 1.5 s | 1.6 s | n/a | n/a | 1.5 s |
| 90-150 | 2.0 s | 1.4 s | n/a | 2.1 s | 1.5 s |
| 150-212 | 3.0 s | 1.6 s | 1.4 s | 2 s | 1.4 s |
| 212-250 | 4.0 s | 2.2 s | 2.5 s | 2.6 s | 1.8 s |
| 250-300 | 5.0 s | 2.4 s | 2.5 s | 2.6 s | 2.0 s |
| 300-425 | 8.0 s | 3.0 s | 3.6 s | n/a | 2.5 s |
| 425-600 | 10.0 s | n/a | 3.6 s | n/a | n/a |

TABLE 6

$t_{100\%}$ for Selected Salt Compositions

| Particle Size (μm) | Pure Salt | Alberger Select | 15-micron | Alberger Fine Flake | Antisolvent Salt |
|---|---|---|---|---|---|
| 45-90 | 2.5 s | 2.2 s | n/a | n/a | 2.2 s |
| 90-150 | 3.3 s | 2.4 s | n/a | 3.0 s | 2.0 s |
| 150-212 | 5.0 s | 3.2 s | 4.2 s | 3.3 s | 2.5 s |
| 212-250 | 5.2 s | 3.5 s | 5.2 s | 3.7 s | 2.3 s |
| 250-300 | 7.5 s | 3.7 s | 5.3 s | 4.0 s | 3.3 s |
| 300-425 | 13.0 s | 5.0 s | 6.2 s | n/a | 4.5 s |
| 425-600 | 14.0 s | n/a | 6.8 s | n/a | n/a |

The data included within Tables 3-6 show that $t_{50\%}$, $t_{80\%}$, $t_{90\%}$, and $t_{100\%}$ increases with increasing particle sizes. Further, different morphologies affect dissolution times. The 15-micron salt and the antisolvent salt composition dissolve faster than pure salt, Alberger Select, and Alberger Fine Flake salt.

Figure 8:
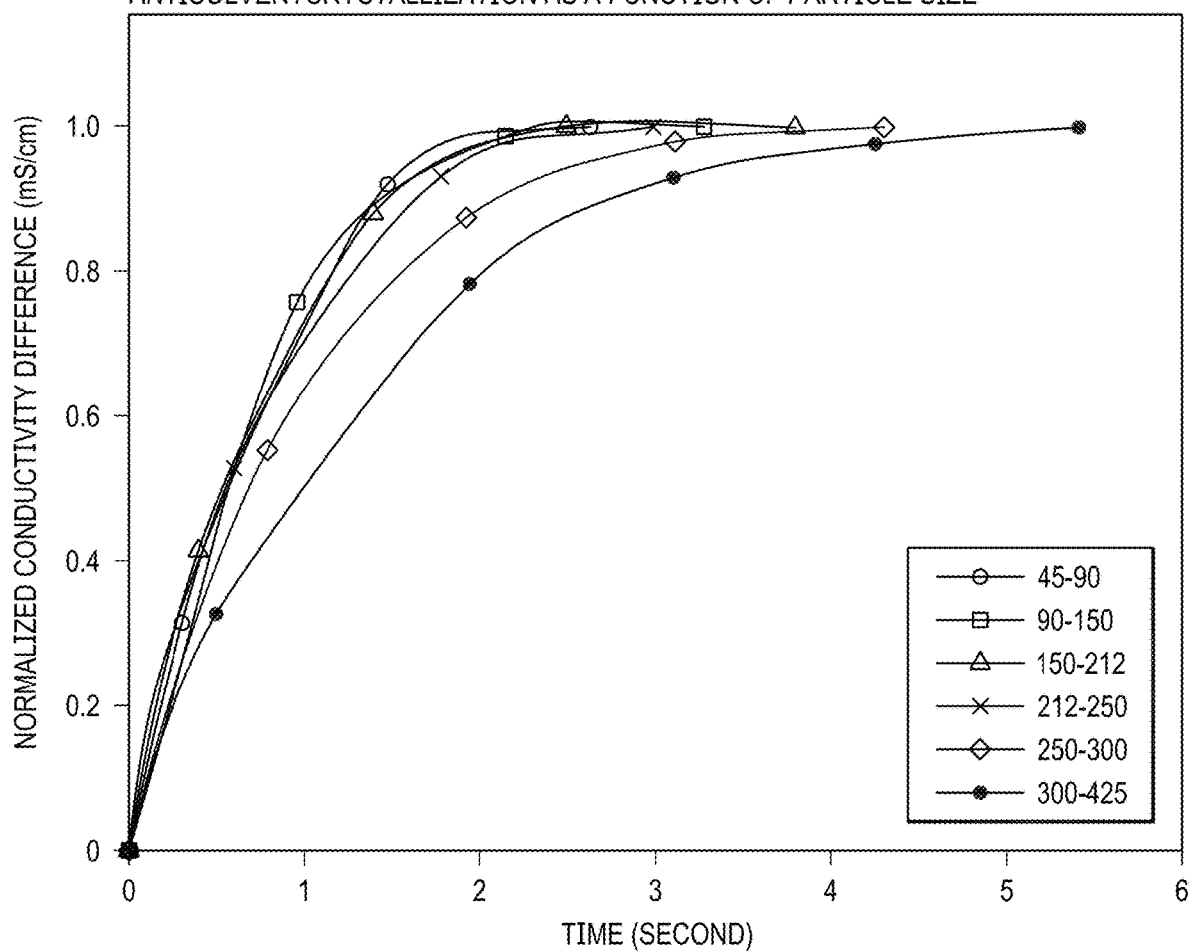
FIG. 8 is a graph depicting dissolution behavior of hopper cubes as a function of particle size.

FIG. 8 is a graph depicting dissolution behavior of salt crystals formed by antisolvent crystallization as a function of particle size. The graph shows that smaller salt crystals generally dissolve faster than larger salt crystals. The y-axis is represented as the difference between a current conductivity ($c_t$) and the initial conductivity ($c_0$), but normalized to 1 using the following formula:

$$y_{max} = (c_t - c_0) \times \frac{1}{(c_{max} - c_0)},$$

where $c_{max}$ is the maximum conductivity reached.

Having established that the novel salt composition formed by antisolvent crystallization has a higher dissolution rate than a majority of conventionally available salt, a test was performed to compare a sample of commercially available potato chips (control sample) with samples salted with the novel salt composition at varying concentrations (experimental samples). An expert panel was asked to compare the control sample and experimental samples according to a number of attributes, one of which included salty taste. The expert panel concluded that an experimental sample with about a 20% less sodium than the control sample was perceived as salty as the control sample.

The salt composition, corresponding method of manufacture, and reduced salt food product described herein is a remarkable improvement on the prior art because the amount of salt applied to a food product can be reduced by at least 20% with no meaningful difference in saltiness perception by the consumer. Moreover, novel aspects of certain embodiments described herein can achieve sodium reduction without the inclusion of compounds other than sodium chloride.

Additional Embodiments

The following descriptive embodiments are offered in further support of the disclosed invention:

In a first embodiment, novel aspects of the present disclosure are directed to a salt composition comprising a plurality of salt crystals with a surface area of at least 0.19-0.23 m²/g and a Hall density of less than 0.8 g/cm³.

In another aspect of the first embodiment, the salt composition comprises a plurality of salt crystals with a surface area of at least 0.19-0.23 m²/g and a Hall density of less than 0.8 g/cm³, the salt composition further comprising one or more limitations selected from the following:

wherein the plurality of salt crystals further comprises a bulk density of less than 0.90 g/cm³;

wherein each of the plurality of salt crystals is at least 10 μm in size;

wherein the plurality of salt crystals comprises a first portion having a mature hopper cube morphology;

wherein the plurality of salt crystals in the first portion are between 80-150 μm in size;

wherein the plurality of salt crystals further comprises a second portion having a simple hopper cube morphology, a third portion having a hollow cube morphology, and a fourth portion having a solid cube morphology;

wherein the plurality of salt crystals in the second portion are between 50-100 μm in size, wherein the plurality of salt crystals in the third portion are between 30-50 μm in size, wherein the plurality of salt crystals in the fourth portion are between 15-25 μm in size;

wherein the plurality of salt crystals further comprises a fifth portion having a complex hopper cube morphology;

wherein the plurality of salt crystals in the fifth portion are between 80-150 μm in size;

wherein the plurality of salt crystals comprises sodium chloride;

wherein the plurality of salt crystals further comprises an additive in an amount between 0.3-0.8 wt % of the salt crystals; and wherein the additive is selected from the group consisting of barbituric acid, glycine, and sodium citrate.

In a second embodiment, novel aspects of the present disclosure are directed to a method for forming a salt composition, the method comprising: providing an antisolvent solution; adding a salt solution to the antisolvent solution to form a supersaturated solution, wherein the salt solution has a concentration greater than 15 wt % solute, wherein the mass ratio of the salt solution to antisolvent solution is in the range of 1:20 to 1:1.25; and crystallizing the supersaturated solution to form the salt composition with a plurality of salt crystals with a surface area of at least 0.19-0.23 m²/g and a Hall density of less than 0.8 g/cm³.

In another aspect of the second embodiment, novel aspects of the present disclosure are directed to a method for forming a salt composition, the method comprising: providing an antisolvent solution; adding a salt solution to the antisolvent solution to form a supersaturated solution, wherein the salt solution has a concentration greater than 15 wt % solute, wherein the mass ratio of the salt solution to antisolvent solution is in the range of 1:20 to 1:1.25; and crystallizing the supersaturated solution to form the salt composition with a plurality of salt crystals with a surface area of at least 0.19-0.23 $m^2/g$ and a Hall density of less than 0.8 $g/cm^3$, the method further comprising one or more limitations selected from the following:

wherein the salt solution comprises a solute dissolved in a solvent, and wherein the salt solution is less than 27 wt % salt solution;

wherein the solute comprises sodium chloride, and wherein the solvent comprises water;

wherein the antisolvent is ethanol;

wherein the antisolvent is less than 100 vol % ethanol;

wherein the antisolvent is greater than 90 vol % ethanol;

wherein the supersaturated solution is crystallized between 5-15 minutes to form the salt composition;

wherein the supersaturated solution is crystallized for about 10 minutes to form the salt composition;

wherein the mixing step further comprises mixing the supersaturated solution with the magnetic stir bar rotating at 125 RPM or less;

wherein the method further comprises drying the salt composition;

wherein the drying step further comprises vacuum filtration;

wherein the salt solution comprises an additive in the range of 0.3-0.8 wt % relative to the solute;

wherein the additive is selected from the group consisting of barbituric acid, glycine, and sodium citrate;

wherein the salt composition comprises hopper cubes with a size in the range of 80-150 μm;

wherein the hopper cubes have a surface area between 0.23-0.19 $m^2/g$;

wherein the salt composition further comprises simple hopper cubes, hollow cubes, and solid cubes;

wherein the salt composition further comprises complex hopper cubes;

wherein steps of the method are carried out at a temperature between 20-30° C.; and wherein the method further comprises filtering the salt composition to obtain a select particle sizes.

In a third embodiment, novel aspects of the present disclosure are directed to a food product comprising an outer surface; and a salt composition applied to the outer surface of the food product, wherein the salt composition comprises a plurality of salt crystals with a surface area of at least 0.19-0.23 $m^2/g$ and a Hall density of less than 0.8 $g/cm^3$.

In another aspect of the third embodiment, novel aspects of the present disclosure are directed to a food product comprising an outer surface; and a salt composition applied to the outer surface of the food product, wherein the salt composition comprises a plurality of salt crystals with a surface area of at least 0.19-0.23 $m^2/g$ and a Hall density of less than 0.8 $g/cm^3$, the food product further comprising one or more limitations selected from the following:

wherein each of the plurality of salt crystals is at least 10 μm in size;

wherein the salt composition comprises a first portion having a mature hopper cube morphology;

wherein the plurality of salt crystals in the first portion are between 80-150 μm in size;

wherein the plurality of salt crystals further comprises a second portion having a simple hopper cube morphology, a third portion having a hollow cube morphology, and a fourth portion having a solid cube morphology;

wherein the plurality of salt crystals in the second portion are between 50-100 μm in size, wherein the plurality of salt crystals in the third portion are between 30-50 μm in size, wherein the plurality of salt crystals in the fourth portion are between 15-25 μm in size;

wherein the plurality of salt crystals further comprises a fifth portion having a complex hopper cube morphology;

wherein the plurality of salt crystals in the fifth portion are between 80-150 μm in size; and wherein the plurality of salt crystals comprises sodium chloride.

Although embodiments of the invention have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of."

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A salt composition comprising a plurality of salt crystals with an edge length between 10 μm and 150 μm, a BET surface area of at least 0.19-0.23 $m^2/g$, and a Hall density of less than 0.8 $g/cm^3$, wherein the plurality of salt crystals comprises a first portion having a mature hopper cube morphology, a second portion having a simple hopper cube morphology, a third portion having a hollow cube morphology, and a fourth portion having a solid cube morphology.

2. The salt composition of claim 1, wherein the plurality of salt crystals further comprises a bulk density of less than 0.90 g/cm$^3$.

3. The salt composition of claim 1, wherein the plurality of salt crystals in the second portion are between 50-100 μm in size, wherein the plurality of salt crystals in the third portion are between 30-50 μm in size, wherein the plurality of salt crystals in the fourth portion are between 15-25 μm in size.

4. The salt composition of claim 1, wherein the plurality of salt crystals further comprises a fifth portion having a complex hopper cube morphology.

5. The salt composition of claim 4, wherein the plurality of salt crystals in the fifth portion are between 80-150 μm in size.

6. The salt composition of claim 1, wherein the plurality of salt crystals comprise sodium chloride.

7. A method for forming a salt composition, the method comprising:
   providing an antisolvent solution;
   adding a salt solution to the antisolvent solution to form a supersaturated solution, wherein the salt solution has a concentration greater than 15 wt % solute, and wherein the mass ratio of the salt solution to antisolvent solution is in the range of 1:20 to 1:1.25; and
   crystallizing the supersaturated solution to form the salt composition with a plurality of salt crystals with an edge length between 10 μm and 150 μmm, a BET surface area of at least 0.19-0.23 m$^2$/g, and a Hall density of less than 0.8 g/cm$^3$, wherein the plurality of salt crystals comprises a first portion having a mature hopper cube morphology, a second portion having a simple hopper cube morphology, a third portion having a hollow cube morphology, and a fourth portion having a solid cube morphology.

8. The method of claim 7, wherein the salt solution comprises a solute dissolved in a solvent, and wherein the salt solution is less than 27 wt % of the solute.

9. The method of claim 8, wherein the solute comprises sodium chloride and the solvent comprises water.

10. The method of claim 7, wherein the antisolvent is ethanol.

11. The method of claim 10, wherein the antisolvent is less than 100 vol % ethanol.

12. The method of claim 7, wherein steps of the method are carried out at a temperature between 20-30° C.

13. A food product comprising:
   an outer surface; and
   a salt composition applied to the outer surface of the food product, wherein the salt composition comprises a plurality of salt crystals with an edge length between 10 μm and 150 μmm, a BET surface area of at least 0.19-0.23 m$^2$/g and a Hall density of less than 0.8 g/cm$^3$, wherein the plurality of sodium chloride crystals comprises at least one of a first portion having a mature hopper cube morphology, a second portion having a simple hopper cube morphology, a third portion having a hollow cube morphology, and a fourth portion having a solid cube morphology.

14. The food product of claim 13, wherein the plurality of salt crystals comprise sodium chloride.

* * * * *